(12) United States Patent
Cihlar (10) Patent No.: US 9,945,955 B2
(45) Date of Patent: Apr. 17, 2018

(54) DEVICE FOR INPUTTING RTK CORRECTION DATA TO A GPS

(71) Applicant: Glacial Ridge Technologies, LLC, Glenwood, MN (US)

(72) Inventor: Joseph A. Cihlar, Glenwood, MN (US)

(73) Assignee: Glacial Ridge Technologies, LLC, Glenwood, MN (US)

( * ) Notice: Subject to any disclaimer, the term of this patent is extended or adjusted under 35 U.S.C. 154(b) by 260 days.

(21) Appl. No.: 14/710,833

(22) Filed: May 13, 2015

(65) Prior Publication Data

US 2016/0061958 A1 Mar. 3, 2016

Related U.S. Application Data

(60) Provisional application No. 62/045,170, filed on Sep. 3, 2014.

(51) Int. Cl.
| | |
|---|---|
| *G01S 19/07* | (2010.01) |
| *H04W 4/02* | (2018.01) |
| *G01S 19/04* | (2010.01) |
| *G01S 19/41* | (2010.01) |
| *G01S 19/43* | (2010.01) |
| *G01S 19/00* | (2010.01) |

(52) U.S. Cl.
CPC .............. *G01S 19/07* (2013.01); *G01S 19/04* (2013.01); *G01S 19/41* (2013.01); *G01S 19/43* (2013.01); *H04W 4/02* (2013.01)

(58) Field of Classification Search
CPC .......... G01S 19/07; G01S 19/44; G01S 19/41; G01S 19/04; G01S 19/20; G01S 19/33; G01S 5/009; G01S 5/0063; G01S 5/0009; G01S 13/1427; H04W 8/005; G01C 15/00; G08B 13/1427; G06F 15/16; A01B 69/007
USPC ....................................................... 342/357.44
See application file for complete search history.

(56) References Cited

U.S. PATENT DOCUMENTS

| | | | | |
|---|---|---|---|---|
| 5,878,356 | A * | 3/1999 | Garrot, Jr. ............... | G01S 19/41 348/144 |
| 6,031,488 | A | 2/2000 | Hua et al. | |
| 6,097,337 | A | 8/2000 | Bisio | |
| 6,317,603 | B1 * | 11/2001 | Allison ................... | G01S 19/04 342/357.43 |

(Continued)

FOREIGN PATENT DOCUMENTS

FR 2799000 A1 * 3/2001 ............. G01S 19/07

*Primary Examiner* — Bernarr E Gregory
(74) *Attorney, Agent, or Firm* — Leanne Taveggia Farrell; Westman, Champlin & Koehler, P.A.

(57) ABSTRACT

A communications system includes a GPS receiver that receives GPS position data and GPS correction data, a mobile device having a first transceiver and an adapter coupled to the GPS receiver and having a second transceiver and a voltage regulator. The mobile device accesses RTK correction data over a cellular network using a current GPS position and processes the RTK correction data. The second transceiver of the adapter receives the RTK correction data over a wireless signal sent by the first transceiver of the mobile device. The adapter converts the RTK correction data so that the RTK correction data is receivable by a serial port on the GPS receiver that the adapter is coupled and the voltage regulator derives power from the GPS receiver to power the adapter.

19 Claims, 5 Drawing Sheets

(56) References Cited

U.S. PATENT DOCUMENTS

| | | | |
|---|---|---|---|
| 6,493,650 B1 * | 12/2002 | Rodgers | G01C 15/00 340/438 |
| 6,549,828 B1 * | 4/2003 | Garrot, Jr. | G01S 19/41 348/143 |
| 6,879,283 B1 * | 4/2005 | Bird et al. | G01S 19/07 |
| 7,020,555 B1 * | 3/2006 | Janky et al. | G01S 19/07 |
| 7,158,885 B1 * | 1/2007 | Janky et al. | G01S 19/07 |
| 7,283,090 B2 | 10/2007 | Dentinger et al. | |
| 7,480,511 B2 | 1/2009 | O'Meagher | |
| 7,482,974 B2 * | 1/2009 | Ogawa | G01S 19/07 342/357.41 |
| 7,511,661 B2 * | 3/2009 | Hatch | G01S 19/44 342/357.31 |
| 7,583,373 B2 | 9/2009 | Schwarz | |
| 7,940,210 B2 * | 5/2011 | Fly | G01S 19/20 340/539.13 |
| 7,978,130 B1 | 6/2011 | Cohen et al. | |
| 8,068,789 B2 | 11/2011 | Bell et al. | |
| 8,174,437 B2 * | 5/2012 | Whitehead | G01S 19/33 342/357.24 |
| 8,583,315 B2 * | 11/2013 | Whitehead | A01B 69/007 701/31.4 |
| 8,611,926 B2 | 12/2013 | Hamilton et al. | |
| 8,686,901 B2 * | 4/2014 | Wirola | G01S 19/04 342/357.27 |
| 9,146,319 B2 * | 9/2015 | Leandro | G01S 19/04 |
| 9,562,975 B2 * | 2/2017 | Vollath et al. | G01S 19/07 |
| 2004/0204852 A1 * | 10/2004 | Robbins | G01S 5/009 701/469 |
| 2005/0064878 A1 * | 3/2005 | O'Meagher | G01S 5/0063 455/456.1 |
| 2007/0001900 A1 * | 1/2007 | Heppe | G01S 19/04 342/357.29 |
| 2007/0115176 A1 * | 5/2007 | Zimmerman | G01S 5/0009 342/465 |
| 2011/0021209 A1 * | 1/2011 | Longginou | G01S 5/0009 455/456.1 |
| 2011/0070893 A1 * | 3/2011 | Hamilton | G01S 19/04 455/456.1 |
| 2011/0210849 A1 * | 9/2011 | Howard | G08B 13/1427 340/539.32 |
| 2012/0166137 A1 * | 6/2012 | Grasser | G01C 15/00 702/150 |
| 2013/0113993 A1 | 5/2013 | Dagit, III | |
| 2013/0218950 A1 * | 8/2013 | Sakakihara | G06F 15/16 709/203 |
| 2013/0245946 A1 | 9/2013 | Carlson et al. | |
| 2013/0293412 A1 | 11/2013 | Appleford et al. | |
| 2014/0162545 A1 * | 6/2014 | Edge | H04W 8/005 455/3.01 |
| 2014/0253375 A1 | 9/2014 | Rudow et al. | |
| 2014/0266877 A1 | 9/2014 | McClure et al. | |

* cited by examiner

DEVICE FOR INPUTTING RTK CORRECTION DATA TO A GPS

CROSS-REFERENCE TO RELATED APPLICATIONS

The present application is a utility application and claims priority to U.S. provisional patent application Ser. No. 62/045,170, filed Sep. 3, 2014, the content of which is hereby incorporated by reference in its entirety.

BACKGROUND

Satellite navigation systems (i.e., global positioning systems (GPS)) provide location and time information anywhere on or near the Earth where there is an unobstructed line of sight to four or more GPS satellites. GPS is freely accessible to anyone with a GPS receiver. Such GPS receivers are found in various commercial equipment including surveying equipment, tractors, bull dozers, land levelers and the like, and are used for the accurate manipulation and analysis of large amounts of geospatial data. For example, GPS-based applications are useful in precision agriculture and are being used for farm planning, field mapping, soil sampling, tractor guidance, crop scouting and soil/plant treatment.

The discussion above is merely provided for general background information and is not intended to be used as an aid in determining the scope of the claimed subject matter.

SUMMARY

A communications system includes a GPS receiver, a mobile device, a cellular network and an adapter. The GPS receiver receives GPS position data and GPS correction data. The mobile device includes a first transceiver and accesses RTK correction data over a cellular network using a current GPS position and process the RTK correction data. The adapter includes a second transceiver that receives the RTK correction data over a wireless signal sent by the first transceiver of the mobile device and a voltage regulator. The adapter converts the RTK correction data so that the RTK correction data is receivable by a serial port on the GPS receiver that the adapter is coupled. The voltage regulator derives power from the GPS receiver to power the adapter.

A method of inputting RTK correction data to a GPS receiver is provided. RTK correction data is received, by a Bluetooth® transceiver in an adapter, from a mobile device over a Bluetooth® signal. The RTK correction data is converted to an RS232 signal, by a RS232 line driver in the adapter, so as to be received by a serial port on the GPS receiver.

A communications system includes a GPS receiver, a mobile device that accesses RTK correction data over a cellular network and processes the RTK correction data and an adapter having a voltage regulator, a wireless transceiver in communication with the mobile device transceiver, and a RS232 transceiver in communication with the GPS receiver. The mobile device includes a mobile device transceiver that sends and receives data signals. The voltage regulator derives power from the GPS receiver for operating the wireless transceiver. The wireless transceiver receives a data signal from the mobile device having RTK correction data. The RS232 transceiver converts the data signal received by the wireless transceiver to a RS232 data signal so as to communicate the RTK correction data to the GPS receiver.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

A plug-and-play device or adapter is described herein that provides a serial connection for inputting Real Time Kinematic (RTK) correction data via a signal to a GPS receiver. The adapter is a small, hand-held, user-friendly and ready to install into a user's GPS on-board moving equipment. The adapter interfaces with a mobile device, such as a smartphone or a tablet computer, via a signal, such as a wireless Bluetooth® signal, and interfaces with a GPS receiver via a R232 serial port. Bluetooth® is a wireless technology standard for the exchanging of data over distances to and from fixed and mobile devices and various networks. The Bluetooth® standard is managed by overseeing the development of the specification, the management of the qualification program and the protection of registered trademarks. The mobile device accesses the RTK correction data from a CORS (Continually Operated Reference Station) network of RTK base stations that broadcast GPS corrections and relays the data to the device. The adapter converts the data signal into RS232 and transmits the data to the GPS receiver.

GPS signals by themselves are not all that accurate. Even the best GPS receivers have roughly one meter repeatability. This is not enough for planting crops or for surveying. Manufacturers of GPS receivers allow a way to correct the error in the signal so that the repeatability is in the 1-2 centimeter range. This is more than sufficient to plant crops, build roads, mark property lines, etc. To correct the error in the signal, a reference station that has a fixed and known location also receives GPS signals. Because the reference station is known and fixed, it can calculate the error in the GPS signal being sent to the GPS receiver that is attached to moving equipment and report that "offset" to the moving GPS receiver.

For example, a radio link can be used that connects the base station to the GPS receiver on the moving equipment. In such a configuration, the range is limited to about 6 miles and the person using the GPS receiver must own and operate their own reference station or purchase a signal from a dealer. Even though corrections take less than one minute for desired accuracy, this configuration is costly to the user.

In another example, a signal can be received via satellite on a different band than the GPS receiver being used by the user. This signal does not require additional hardware, but does require a rather expensive subscription. Convergence of correction data can take as long as 45 minutes.

In yet another example, the GPS receiver includes a RS232 serial port and can receive correction data through this port via cables that are connected to a hub or other device that can access the Internet. Using the hub or other device, correction data is accessible via the Internet and is called NTRIP data (Networked Transport of RTCM via Internet Protocol). NTRIP is a protocol for moving RTK correction data from a base station to moving equipment using the Internet. The NTRIP data is downloaded from or streamed over the Internet. These hub-type systems can use either dealer run correction data, which costs the user a yearly subscription, or state run correction data through a Continually Operated Reference Station (CORS) network, which is little to no cost to the user. Because these hub-type systems have a cellular modem and GPS built into them, the hub systems need to be hard wired to the vehicle or moving equipment (making moving the hub system to a different vehicle difficult) for power and may cause users to have a cellular phone data plan activated on each piece of equipment that has the hub or other device. Also, to ensure that the CORS network operates correctly with these systems, the CORS network needs to know the initial GPS position of the equipment to be able to give reference to what base station needs to be accessed in the network. Because of these added complexities, it is not uncommon for these hub-based systems to misreport location and subsequently stall.

Figure 1:
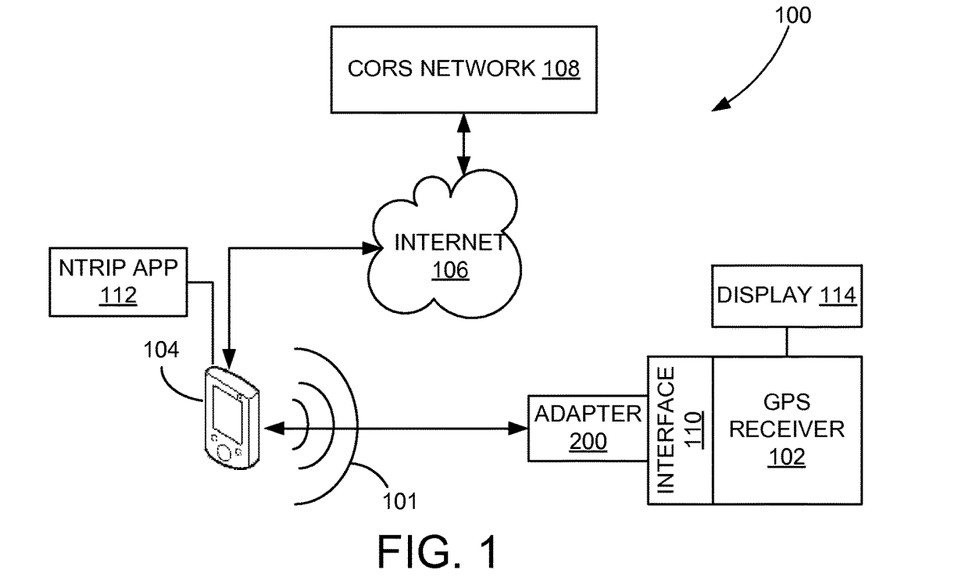
FIG. 1 illustrates a block diagram of a communication system according to one embodiment.

FIG. 1 illustrates a block diagram of a communications system 100 including a plug-and-play device or adapter 200, which provides a serial connection for inputting RTK correction data via a signal 101, such as a wireless signal including Bluetooth®, to a GPS receiver 102. In other words, adapter 200 converts signal 101, such as a wireless Bluetooth® signal, to RS232 for GPS receiver 102. A wireless signal is the exchanging of data over a distance using radio waves.

Communications system 100 includes GPS receiver 102, a mobile device 104 having a Bluetooth® transceiver module, such as an android phone, an iOS phone or a tablet computer that can connect to the Internet 106 and act as a server over a cellular network, and a CORS network 108, which provides NTRIP RTK correction data. Coupled to GPS receiver 102 through an interface or port 110 is adapter 200. In one embodiment, interface or port 110 is an RS232 serial connection.

Figure 2:
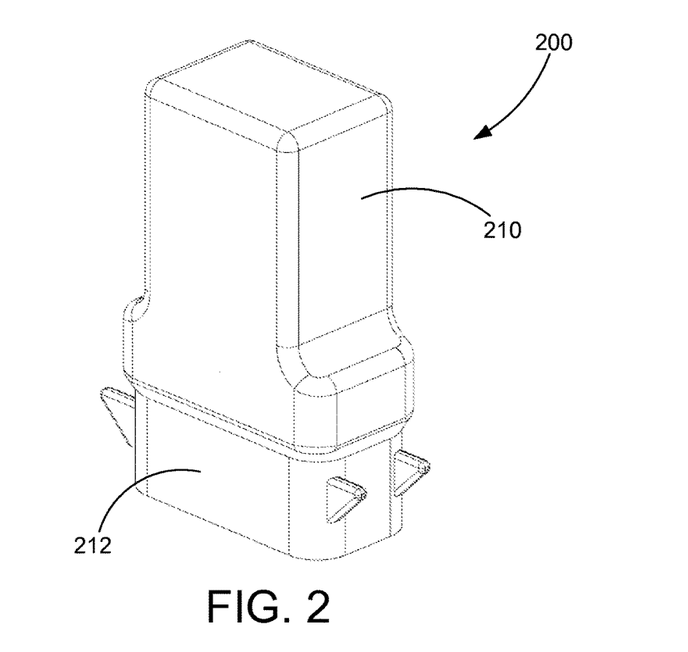
FIG. 2 illustrates a perspective view of an adapter for use with the communication system illustrated in FIG. 1.
Figure 3:
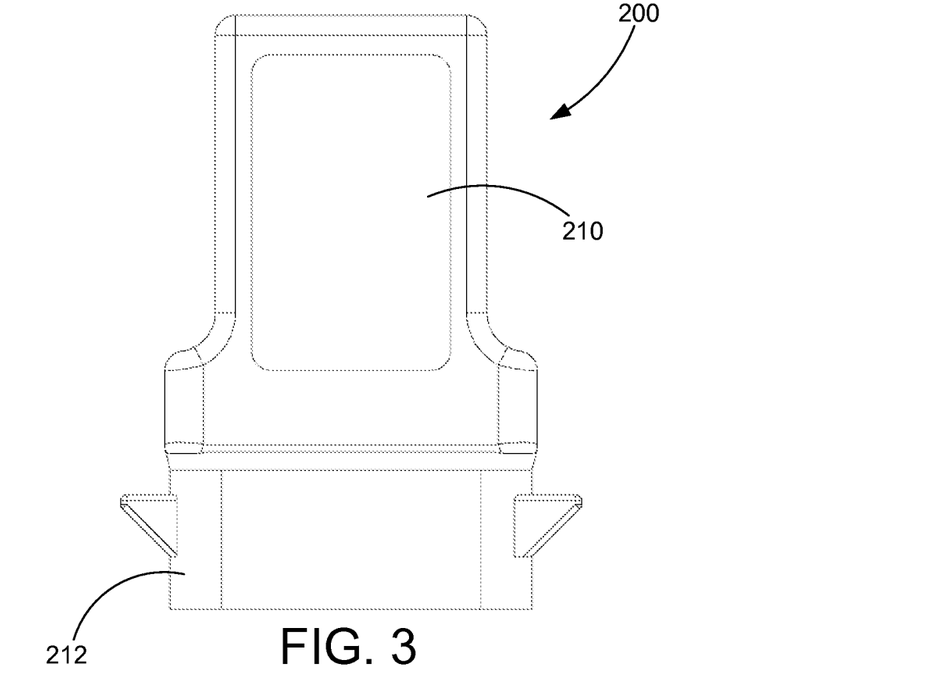
FIG. 3 illustrates a back view of the adapter of FIG. 2.
Figure 4:
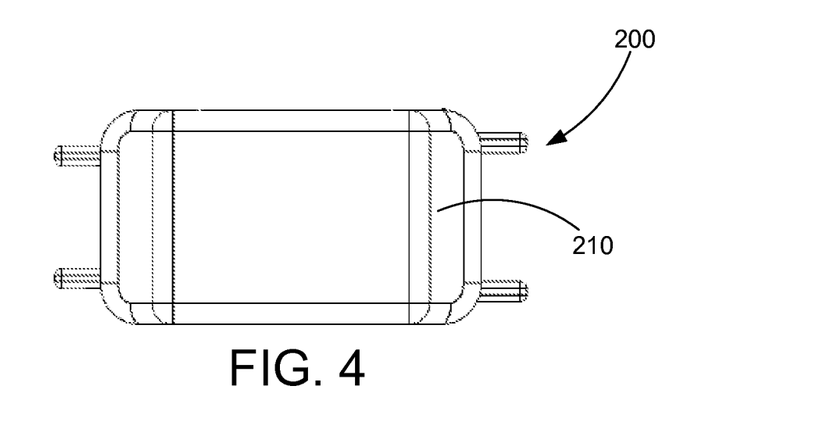
FIG. 4 illustrates a top view of the adapter of FIG. 2.
Figure 5:
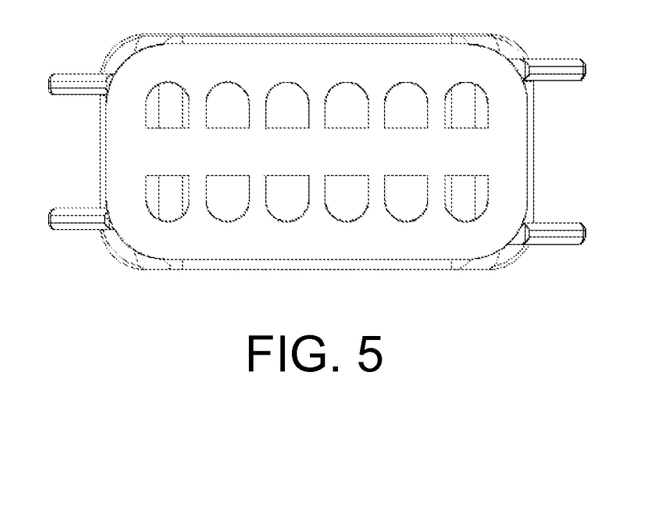
FIG. 5 illustrates a bottom view of the adapter of FIG. 2.
Figure 6:
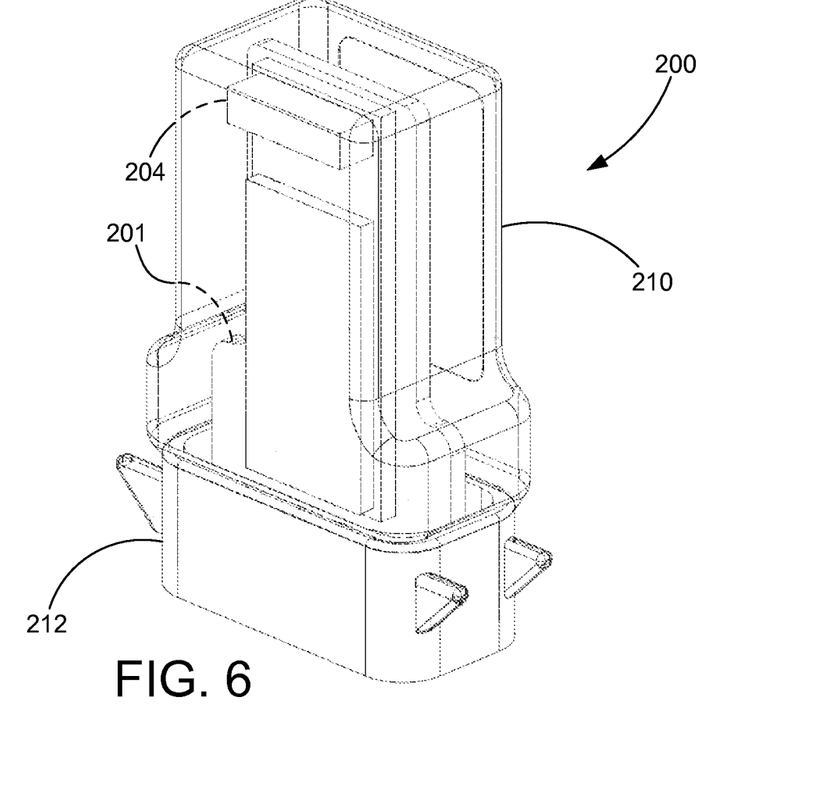
FIG. 6 illustrates a perspective view of the adapter in FIG. 2 with internal components illustrated in phantom.
Figure 7:
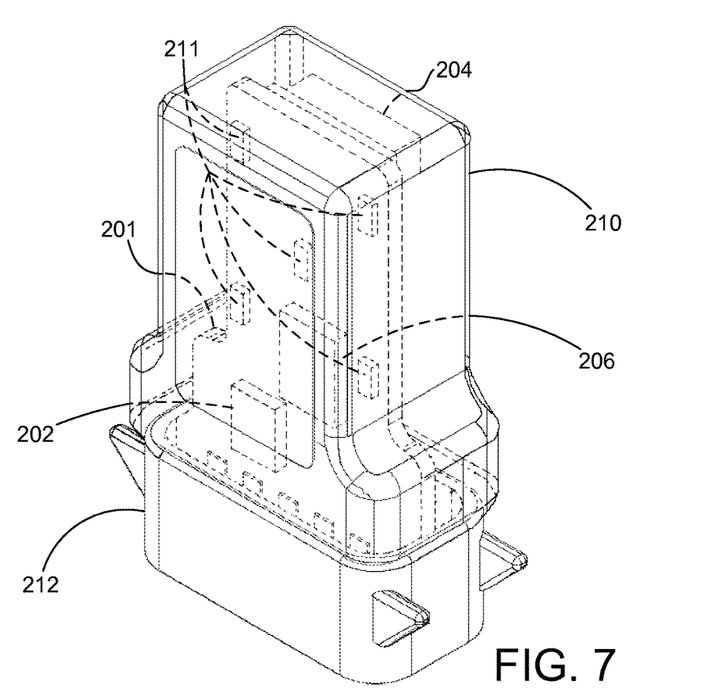
FIG. 7 illustrates a side view of FIG. 6.
Figure 8:
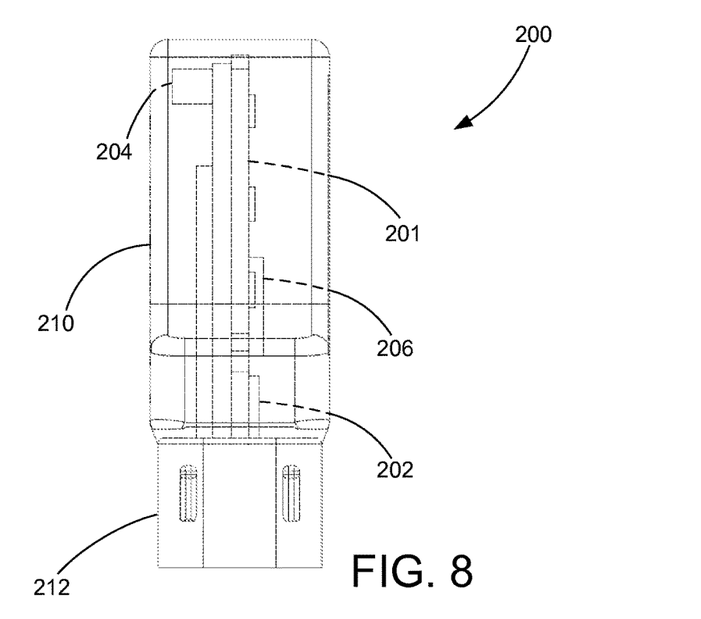
FIG. 8 illustrates a schematic diagram of the adapter illustrated in FIGS. 2-7.
Figure 9:
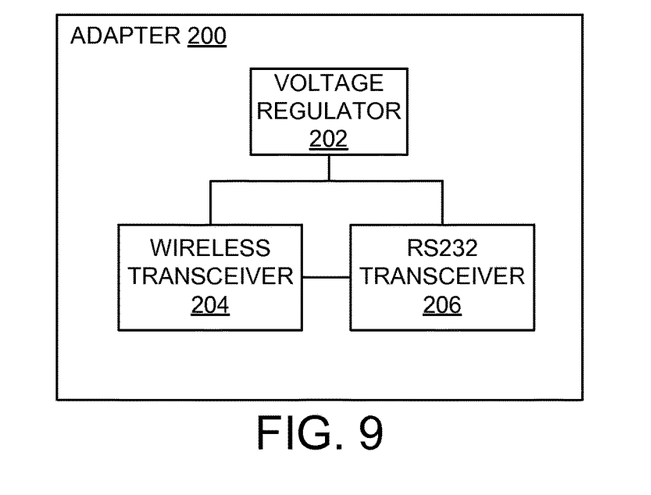
FIG. 9 illustrates a simplified block diagram of internal components of the adapter illustrated in FIGS. 2-7.
Figure 10:
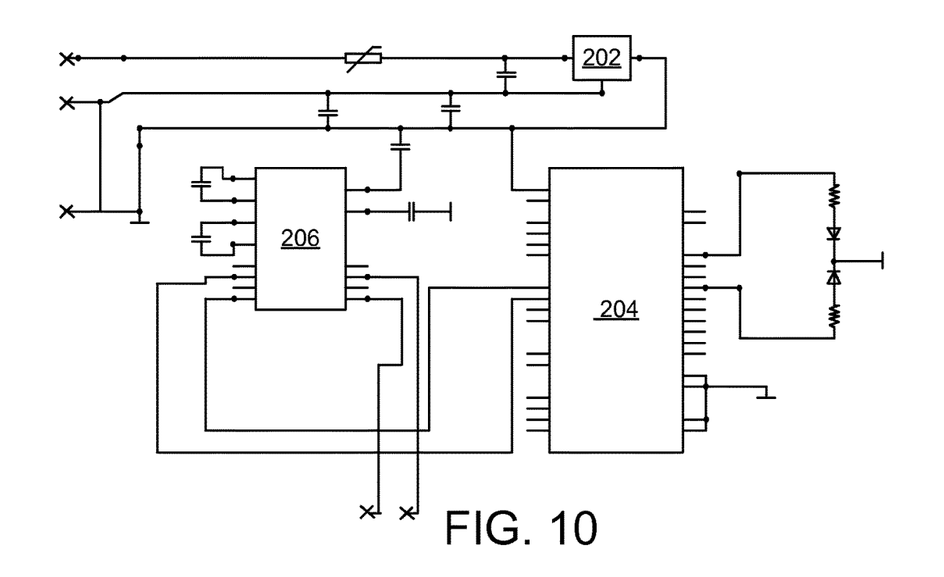
FIG. 10 illustrates a schematic circuit diagram of the internal circuitry in the adapter illustrated in FIGS. 2-7.

FIG. 2 illustrates a perspective view of adapter 200 according to one embodiment. FIG. 3 is a back view of FIG. 2, FIG. 4 is a top view of FIG. 2 and FIG. 5 is a bottom view of FIG. 2. FIGS. 6 and 7 illustrates front and back perspectives view of adapter 200 but with interior components illustrated in phantom. FIG. 8 is a side view of FIGS. 6 and 7. FIG. 9 illustrates a simplified block diagram of the internal components of adapter 200. FIG. 10 illustrates a schematic circuit diagram of the internal circuitry in adapter 200.

Adapter 200 includes an external housing 210 and an electrical connector 212 for electrically coupling the components of adapter 200 that are within external housing 210 to GPS receiver 102. As illustrated in FIG. 5, electrical connector 212 includes a plurality of holes and interior pins for mating with interface or port 110 on GPS receiver 102. Electrical connector 212 is encapsulated in a thermoset resin, making the electronics of adapter 200 waterproof. As illustrated in FIGS. 6-8, the electronics of adapter 200 are mounted onto a printed circuit board (PCB) 201 and molded together inside external housing 210.

As illustrated in FIGS. 6-10, adapter 200 includes at least one voltage regulator 202, a wireless transceiver 204, such as a Bluetooth® transceiver, for communicating with another enabled transceiver on mobile device 104, such as an enabled Bluetooth® transceiver, and a RS232 transceiver or line driver 206 for communicating with GPS receiver 102 through interface 110. All of voltage regulator 202, wireless transceiver 204 and RS232 transceiver 206 are mounted on PCB 201 and electrically connected together as indicated in the schematic circuit diagram of FIG. 10. All components of adapter 200 are preconfigured to work with a display 114 on GPS receiver 102 so no knowledge by the user in terms of networking protocols and computers is necessary to make adapter 200 function. As illustrated in FIG. 7, a plurality of status LED indicators 211 are also provided.

Voltage regulator 202 that is housed in external housing 210 of adapter 200 reduces 12 volt power (or other power depending on the application) from the GPS receiver 102 to the required voltage needed to power wireless transceiver 204. In the example where wireless transceiver 204 is a Bluetooth® transceiver, voltage regulator 202 reduces the power of the GPS receiver 102 to the required 3.3 volts needed by the Bluetooth® transceiver. Without voltage regulator 202, a user would have to provide an external power supply and/or regulator, which would need to be wired to the vehicle battery or GPS receiver 102, adding cost and inconvenience to the user.

Wireless transceiver 204 receives data from mobile device 104 and converts the data to TTL (transistor-transistor logic), which works by assigning logic high and logic low to voltages. In the example where wireless transceiver 204 is a Bluetooth® transceiver, logic low is 0 volts and logic high is 3.3 volts. As previously discussed, logic high of 3.3 volts can be lower or higher depending on the application.

RS232 transceiver 206 is a line driver integrated circuit and is the component in adapter 200 that directly interfaces with GPS receiver 102. Transceiver 206 converts the TTL serial signal to an RS232 signal. RS232 works similarly to TTL, but with the logic high being a negative voltage and logic low being a positive voltage. Adapter 200 includes a doubler, so in the example where wireless transceiver 204 is a Bluetooth® transceiver, the RS232 signal has a logic low of 6.6 volts and the logic high of −6.6 volts.

Adapter 200 is preconfigured for users including baud rate and other important settings so that adapter 200 can readily communicate with a user's equipment. If a user desires to change any of the settings to use adapter 200 with other pieces of equipment other than, for example, a GPS receiver or a mobile device, the user is free to do so without any special hardware programming.

GPS receiver 102 includes display 114 for displaying RTK data. In other words, GPS receiver should be unlocked to allow RTK correction data. Mobile device 102 includes an NTRIP software application 112 and has access to a 4G cellular network. Although a 3G or earlier data cellular network can work, a 4G cellular network provides additional hardware support that allows for RTK corrections to be input to the GPS receiver while simultaneously being able to talk or perform other cellular network functions on mobile device 102.

Communication system 100 requires no cables. Communication is performed by radio frequency using Bluetooth® or other types of signals including Wifi, and through a cellular network. In addition, adapter 200 requires no additional power supply. Adapter 200 requires low power consumption (less than 100 mA of power) and that power is derived from GPS receiver 102. For example, the range of radio frequency provided by Bluetooth® is up to 100 feet. However, 30-50 feet is a better range. Mobile device 104 will be in the moving equipment and the adapter will be plugged into GPS receiver 102, so the distance between mobile device 104 and GPS receiver 102 shouldn't be more than 5 feet. However, if mobile device 104 gets out of range, NTRIP software application 112 located on mobile device 104 seamlessly reconnects to adapter 200 upon entering back into the appropriate range as well as taking less than 20 seconds to continue receiving RTK correction data.

A method of inputting RTK correction data to GPS receiver 102 is as follows. A user plugs adapter 200 into an interface or connector 110 on GPS receiver 102. In particular, a RS232 serial connector. An LED on adapter 200 flashes quickly denoting that adapter 200 is in start up mode. Upon the LED flashing slowly, adapter 200 is ready to be paired with mobile device 104. On mobile device 104, a user toggles to Bluetooth® settings, turns the Bluetooth® on and searches for available devices. Adapter 200 is selected and mobile device 104 is paired with adapter 200. This pairing only needs to be performed once.

Next, all data processing is completed on mobile device 104. The user selects to open NTRIP software application 112. Under receiver settings, the paired adapter 200 is selected. Under NTRIP settings and depending on what port on GPS receiver 102 is being used, the current GPS position data or current location of the moving equipment will be output automatically from GPS receiver 102 to mobile device 104 via an NMEA string so that mobile device 104 knows which tower to access RTK correction data from on CORS network 108. In this embodiment, the NMEA string can be generated from the GPS source (i.e., GPS receiver 102) and populated with position data. This NMEA string of information is generated by GPS receiver 102, received by adapter 200 and sent on to mobile device 104. In other words, adapter 200 is performing two-way communication. First it communicates the current GPS position from GPS receiver 102 and then it communicates RTK correction to GPS receiver 102.

In another embodiment and in the event that an NMEA string cannot be generated and populated with position data by GPS receiver 102, an NMEA string can be created and populated with current position data from a location sourced by mobile device 104. In this way, adapter 200 acts only as one-way communication by delivering RTK correction data to GPS receiver 102. In yet another embodiment and in the event that an NMEA string cannot be generated and populated with position data by GPS receiver 102, an NMEA string can be created and populated with position data that is input manually into the NTRIP software application 112 on mobile device 104. In this way, adapter 200 also act only as one-way communication by delivering RTK correction data to GPS receiver 102.

After current position is inputted, the user selects to connect to CORS network 108 via a username and password on the NTRIP software application 112 and the LED on adapter 200 transitions from flashing to turning fully on, which indicates data is being received. RTK data corrections are received by adapter 200, converted to RS232 and are input to GPS receiver 102. The RTK data corrections are shown on display 114 on GPS receiver 102.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A communications system comprising:
a GPS receiver that receives GPS position data and GPS correction data;
a mobile computing device located remotely from the GPS receiver and including a first transceiver, wherein the mobile device accesses RTK correction data over a cellular network using a current GPS position and processes the RTK correction data; and
a handheld adapter physically and removably coupled to the GPS receiver and including a voltage regulator and a second transceiver that receives the RTK correction data over a wireless signal sent by the first transceiver of the mobile device, wherein the handheld adapter converts the RTK correction data, transmits the converted RTK correction data to a serial port on the GPS receiver and derives power from the GPS receiver using the voltage regulator to power the handheld adapter.

2. The communication system of claim 1, wherein the handheld adapter further receives the current GPS position from the GPS receiver and sends the current GPS position to the mobile computing device with the second transceiver so that proper RTK correction data is accessed.

3. The communication system of claim 1, wherein the current GPS position is sourced by the mobile computing device.

4. The communication system of claim 1, wherein the current GPS position is manually input into the mobile computing device by a user.

5. The communication system of claim 1, wherein the handheld adapter comprises an electrical connector that couples to the GPS receiver and is encapsulated by a waterproof thermoset resin.

6. The communication system of claim 1, wherein the second transceiver converts the RTK correction data to TTL data.

7. The communication system of claim 6, wherein the handheld adapter further comprises an R232 transceiver that directly interfaces with the GPS receiver and converts the TTL data to an R232 signal.

8. A method of inputting RTK correction data to a GPS receiver, the method comprising:
receiving RTK correction data, by a wireless transceiver in a handheld adapter that is physically and removably coupled to the GPS receiver, from a mobile computing device that is connected to a cellular network and is located remotely from the GPS receiver over a wireless signal;
converting the RTK correction data to an RS232 signal by a RS232 line driver in the handheld adapter; and
transmitting the RS232 signal to a serial port on the GPS receiver.

9. The method of claim 8, further comprising powering the wireless transceiver and the RS232 line driver in the handheld adapter using a voltage regulator that derives power from the GPS receiver.

10. The method of claim 9, further comprising accessing RTK correction data over a cellular network, by the mobile computing device, using a current GPS position.

11. The method of claim 10, further comprising receiving the current GPS position, by the handheld adapter, from the GPS receiver and sending, by the handheld adapter, the current GPS position to the mobile computing device.

12. The method of claim 10, further comprising receiving the current GPS position from a user manually entering the current GPS position into the mobile computing device.

13. The method of claim 8, further comprising powering the wireless transceiver and the RS232 line driver in the handheld adapter using a voltage regulator located in the handheld adapter that derives power from the GPS receiver.

14. The method of claim 8, wherein converting the RTK correction data to the RS232 signal comprises converting the RTK correction data received by the wireless transceiver in the handheld adapter into TTL data.

15. The method of claim 14, further comprising converting the TTL data to the RS232 signal, by the RS232 line driver, to be received by the GPS receiver.

16. A communications system comprising:
a GPS receiver;
a mobile computing device located remotely from the GPS receiver that accesses RTK correction data over a cellular network and processes the RTK correction data, the mobile computing device including a mobile device transceiver that sends and receives data signals;
a handheld adapter physically and removably coupled to the GPS receiver and including a voltage regulator, a wireless transceiver in communication with the mobile device transceiver, and a RS232 transceiver in communication with the GPS receiver;
wherein the voltage regulator derives power from the GPS receiver for operating the wireless transceiver;
wherein the wireless transceiver receives a wireless data signal from the mobile computing device that contains RTK correction data; and
wherein the RS232 transceiver converts the data signal received by the wireless transceiver to a RS232 data signal and communicates the RTK correction data to the GPS receiver.

17. The communications system of claim 16, wherein the handheld adapter further receives the current GPS position from the GPS receiver and sends the current GPS position to the mobile computing device with the wireless transceiver so that proper RTK correction data is accessed.

18. The communications system of claim 16, wherein the current GPS position is sourced by the mobile computing device.

19. The communication system of claim 16, wherein the current GPS position is manually input into the mobile computing device by a user.

* * * * *